United States Patent [11] 3,609,179

| [72] | Inventors | John F. Cavalla<br>Isleworth;<br>Roy Simpson, Taplow; Alan C. White,<br>Windsor, all of England |
|---|---|---|
| [21] | Appl. No. | 701,824 |
| [22] | Filed | Jan. 31, 1968 |
| [45] | Patented | Sept. 28, 1971 |
| [73] | Assignee | John Wyeth & Brother Limited<br>Taplow, England |
| [32] | Priority | Feb. 13, 1967 |
| [33] | | Great Britain |
| [31] | | 6777/67 |

[54] LOWER ALKYL 9-CARBOXYLATES OF 9-(TERT.-AMINOBUTYNYL) FLUORENES
5 Claims, No Drawings

[52] U.S. Cl.................................................. 260/471 A,
260/247.2 A, 260/247.2 B, 260/247.7 A, 260/268
TR, 260/326.3, 260/326.5 N, 260/465 K, 260/335,
260/570.5 R, 424/248, 424/250, 424/274,
424/283, 424/309, 424/324, 424/330

[51] Int. Cl....................................................... C07d 87/26,
C07c 101/04
[50] Field of Search............................................ 260/471 A,
471

[56] References Cited
UNITED STATES PATENTS
3,419,604   12/1968   Kaiser et al.....................  260/471

*Primary Examiner*—Nicholas S. Rizzo
*Assistant Examiner*—Anne Marie T. Tighe
*Attorney*—Dwight J. Potter

ABSTRACT: Fluorene and Xanthene compounds bearing at the 9-position (1) a carboxyl derivative, e.g., an ester, amide, substituted amide, or hydroxymethyl and (2) a 4-tertiaryamino-2-butynyl substituent are useful as antiulcer, anti-inflammatory, anticonvulsant, and analogesic agents. The corresponding quaternary salts, e.g., their methiodides, are similarly useful.

LOWER ALKYL 9-CARBOXYLATES OF 9-(TERT.-AMINOBUTYNYL) FLUORENES

This invention relates to pharmaceutical compositions containing novel fluorene and xanthene compounds, to various of such novel compounds and to a process for the preparation thereof.

The present invention provides a pharmaceutical composition comprising a compound of the general formula:

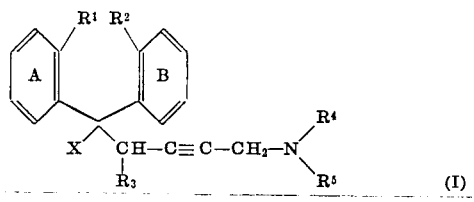

or an acid addition or quaternary ammonium salts thereof (in which $R^1$ and $R^2$ are bonds joined directly together to complete a five-membered ring or linked through an oxygen atom to complete a six-membered ring, $R^3$ is a hydrogen atom or a lower alkyl, e.g., methyl radical, $R^4$ and $R^5$ are the same or different and each is a lower alkyl radical or a benzyl radical or $R^4$ and $R^5$ together complete a ring which may contain a further heteroatom, X is a cyano, carboxyl which may be in salt or ester form, carbamoyl, hydroxymethyl or acyloxymethyl radical and rings A and B are substituted or unsubstituted benzene rings) and a pharmaceutically acceptable carrier. The term "lower" as used herein means that the radical contains one to six, preferably one to four carbon atoms.

The compounds of the above general formula (I), and their acid addition and quaternary ammonium salts exhibit pharmaceutical activity, for example one or more of antiulcer activity, anti-inflammatory activity, anticonvulsant activity, and analgesic activity when tested on warmblooded laboratory animals, and they are valuable as intermediates in the preparation of similar compounds.

Antiulcer activity can be determined by the method of Brodie and Hanson, *Gastroenterology*, 15, 1 (1960), modified by cold stress. Anti-inflammatory activity may be evaluated by the rat paw edema test.

The compounds of the above general formula, where X is a cyano, esterified carboxy or N,N-disubstituted carbamoyl radical are interesting novel compounds, and the invention provides such compounds. They can be obtained by carrying out a Mannich reaction on the corresponding starting material of general formula:

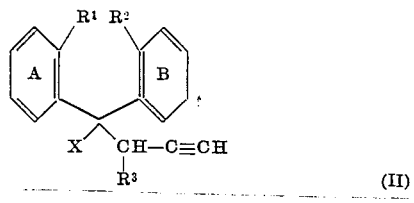

in which $R^1$, $R^2$, $R^3$, A and B have the meanings defined above, and X is a cyano, esterified carboxyl or N,N-disubstituted carbamoyl radical. Reaction conditions known in the art for the Mannich reaction can be used, preferably by heating a compound of the above general formula (II) with a secondary amine of formula

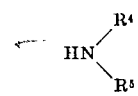

(where $R^4$ and $R^5$ have the meanings defined above) in the presence of formaldehyde or paraformaldehyde. The Mannich reaction generally is carried out by heating the reactants together in solution in an organic solvent at 30° to 120° C. Dioxane is a particularly suitable inert organic solvent to use. The reaction is advantageously carried out in the presence of a catalyst, e.g., cuprous chloride. If desired, the compounds obtained can be converted to corresponding compounds in which X has other of the above-mentioned meanings. For example the ester, N,N-disubstituted carbamoyl or cyano derivative can be hydrolysed to give the acid or salt, which in turn may be converted to an acid halide (e.g., the chloride) and reacted with ammonia or an alkylamine or benzylamine. For example, reaction with ammonia or methylamine yields the unsubstituted carbamoyl or N-methyl carbamoyl derivative respectively. Alternatively, the acid or ester can be reduced, e.g., with $LiAlH_4$ to a hydroxymethyl radical, which may then be esterified to give an acyloxymethyl derivative.

Some of the starting materials of general formula (II) are known, and the others can be prepared in a similar manner to that described in the literature for the known compounds. For example, a compound of general formula:

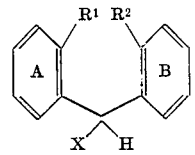

(in which $R^1$, $R^2$, A and B have the meanings defined above and X is a cyano, esterified carboxyl or N,N-disubstituted carbamoyl radical) can be reacted with an alkali metal amide or hydride in an organic solvent or an alkali metal alkoxide in an alcohol (e.g., sodium hydride or amide in dimethyl formamide or sodium ethoxide in ethanol) to form the alkali metal salt, and then the salt can be reacted with an unsaturated compound of general formula:

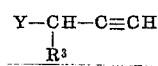

(in which $R^3$ has the meanings defined above and Y is a halogen atom).

As indicated above, the compounds provided by the invention are either fluorene derivatives ($R^1$ and $R^2$ are joined directly together) or xanthene derivatives ($R^1$ and $R^2$ are linked through an oxygen atom). The rings A and B generally are unsubstituted but they optionally can be substituted if desired by radicals which do not take part in the above-described reactions. For example, rings A and B optionally may be substituted by halogen (e.g., chlorine or bromine), lower alkyl (e.g., methyl), lower alkoxy (e.g., methoxy), trihalomethyl (e.g., trifluoromethyl) or nitro. X preferably is an esterified carboxyl radical (e.g., a methoxycarbonyl or ethoxycarbonyl radical). The radical

is a tertiary amino radical, such as a dialkylamino radical containing one to six, preferably one to four carbon atoms in each alkyl group (for example, a diethylamino, diethylamino or diisopropylamino radical), an alkylbenzylamino radical (e.g., a benzylmethylamino radical) or a cyclic amino radical (for example, a morpholino, pyrrolidino or piperidino radical).

Since the compounds of general formula (I) contain a basic nitrogen atom they can form acid addition salts with acid (e.g., hydrochloric acid) or quaternary ammonium salts, e.g., with alkyl halides (for example, methyl iodide, bromide, or chloride) and such salts may be used instead of the free bases if desired.

The carrier for the pharmaceutical composition may be a solid or liquid and any carrier known in the art may be used. The particular dosage will depend on the compound used, chosen route of administration, and standard pharmaceutical practice. For example, the compounds may be administered orally in the form of tablets or capsules which contain standard excipients, or in the form of solutions; or they may be injected parenterally in the form of sterile solutions containing other solutes. In general the compounds are administered at a concentration level which will afford effective results without causing any harmful or deleterious side effects. In tests on standard laboratory animals the compounds of this invention have been generally found to exert their pharmacological action at dosage levels of from about 25 to 200 mg./kg. when administered orally, and at generally lower levels when administered parenterally. The actual dosage used will depend on the activity of the compound used and the condition of the patient to be treated.

The following nonlimiting examples illustrate the invention.

EXAMPLE 1

Methyl 9-(4-diethylamino-2-butynyl)-9-fluorene- carboxylate a. 5.25 g. of methyl 9-propargylfluorene-9-carboxylate were dissolved in 50 mls. of dioxane, and 1.76 g. of diethylamine were added. After adding 30 mg. of cuprous chloride and 0.72 g. of paraformaldehyde, the reaction mixture was heated on a steam bath for one hour giving a brown liquid. The dioxane was evaporated, the residual oil suspended in water, acidified with hydrochloric acid and extracted into methylene chloride. After evaporating the solvent, the residue was recrystallized twice from isopropanol to give 3.70 g. (54%) of the hydrochloride of the title compound as colorless crystals, m.p. 193°–194.5° C.

Analysis:
Found C, 71.5; H, 6.9; N, 3.7; Cl, 9.5%. $C_{23}H_{25}O_2N \cdot HCl$ requires C, 72.1; H, 6.8; N, 3.65; Cl, 9.3%.

Administered orally, this compound showed antiulcer activity at a level of 25 mg./kg., and anti-inflammatory activity at 50 mg./kg.

b. The above hydrochloride (3.0 g.) was converted to the free base by treatment with aqueous sodium carbonate and, after drying, was heated under reflux with methyl iodide (3 ml.) in acetone (20 ml.) for 2 hours. About half the volume of acetone was removed under reduced pressure and the residual solution diluted with ether. The methyl iodide quaternary salt (3.38 g.) of the title compound was obtained as pale yellow crystals, m.p. 132°–3° C.

Analysis:
Found C, 53.8; H, 5.8; N, 2.7%. $C_{24}H_{28}INO_2$ requires C, 53.9; H, 5.8; N, 2.9%.

EXAMPLE 2

Methyl 9-morpholino-2-butynyl)-9-fluorencarboxylate a. The procedure of Example 1 (a) was repeated but replacing the diethylamine by 2.1 g. of morpholine. After working up in a similar manner, there were obtained 4.97 g. (62%) of the hydrochloride of the title compound in the form of crystals of m.p. 188°–189.5° C.

Analysis:
Found C, 68.95; H, 6.4; N, 3.6; Cl, 8.7%. $C_{23}H_{23}NO_3 \cdot HCl$ requires C, 69.6; H, 6.1; N, 3.5; Cl, 8.9%.

Administered orally, this compound shows antiulcer activity at a dosage level of 25 mg./kg., and analgesic activity at 200 mg./kg. Administered parenterally, analgesic action is found at 150 mg./kg.

b. Following the procedure of Example 1 (b) but using methyl 9-(4-morpholino-2-butynyl)-9-fluorenecarboxylate hydrochloride (3.0 g.), methyl iodide (5 ml.) and acetone, 2.45 g. of colorless crystals of the methyl iodide quaternary salt of the title compound were obtained, m.p. 200°–202° C.

Analysis:
Found C, 57.4; H, 5.2; N, 2.65; I, 25.1%. $C_{24}H_{26}NO_3I$ requires C, 57.4; H, 5.2; N, 2.8; I, 25.2%.

EXAMPLE 3

Methyl 9-(4-benzylmethylamino-2-butynyl)-9-fluorenecarboxylate a. The procedure of Example 1 (a) was repeated, but replacing the diethlamine by 2.9 g. of benzylmethylamine. After working up in a similar manner, there were obtained 5.30 g. (61%) of the hydrochloride of the title compound in the form of crystals of m.p. 180°–181° C.

Analysis:
Found C, 75.2; H, 6.3; N, 3.3; Cl, 7.9%. $C_{27}H_{25}NO_2 \cdot HCl$ requires C, 75.1; H, 6.1; N, 3.2; Cl, 8.2%.

Administered orally, this compound shows antiulcer activity at 25 mg./kg., and anti-inflammatory activity at 50 mg./kg.

b. The procedure of Example 1 (b) was followed but using methyl 9-(4-benzylmethylamino-2-butynyl)-9-fluorenecarboxylate (4.0 g.) methyl iodide (7 ml.) and acetone (60 ml.) to give 4.0 g. of cream crystals of the methyl iodide quaternary salt of the title compound, m.p. 193°–195° C.

Analysis: Found 62.1; H, 4.9; N, 2.3; I, 22.2%. $C_{28}H_{28}NO_2$ 1.1/2$H_2O$ requires C, 61.6; H, 5.3; N, 2.6; I, 23.2%.

EXAMPLE 4

Methyl 9-(4-pyrrolidino-2-butynyl)-9-fluorenecarboxylate a. The procedure of Example 1 (a) was followed but the diethylamine was replaced by pyrrolidine (1.71 g.) to yield 5.6 g. of the hydrochloride of the title compound, m.p. 206°–7° C.

Analysis:
Found C, 72.2; H, 6.35; N, 3.6; Cl, 9.1%. $C_{23}H_{24}CLNO_2$ requires C, 72.45; H, 6.3; N, 3.7; Cl, 9.3%.

When administered orally, this compound exhibits antiulcer activity at 25 mg./kg.

b. The procedure of Example 1 (b) was followed but using methyl 9-(4-pyrrolidino-2-butynyl)-9-fluorenecarboxylate hydrochloride (2.7 g.), methyl iodide (3 ml.) and acetone (40 ml.) to yield pale yellow crystals (1.61 g.), m.p. 190°–192 C., of the methyl iodide quaternary salt of the title compound.

Analysis:
Found C, 59.2; H, 5.6; I, 28.2%. $C_{24}H_{26}NO_2$ requires C, 59.2; H, 5.4; I, 26.0%.

EXAMPLE 5

Methyl 9-(4-diisopropylamino-2-butynyl)-9-fluorenecarboxylate a. Following the method of Example 1 (a) but using methyl 9-(2-propynyl)-9-fluorenecarboxylate (7.87 g.), diisopropylamine (3.61 g.), paraformaldehyde (1.0 g.) and cuprous chloride (40 mg.) in dioxan (75 ml.), 9.74 g. of the hydrochloride of the title compound were obtained, m.p. 196°–8 C.

Analysis:
Found C, 73.0; H, 7.5; Cl, 8.6%. $C_{25}H_{30}ClNO_2$ requires C, 72.9; H, 7.3; Cl, 8.6%.

b. Following the method of Example 1 (b) but using methyl 9-(4-diisopropylamino-2-butynyl)-9-fluorenecarboxylate hydrochloride (3.7 g.), methyl iodide (3.5 ml.) and acetone (30 ml.) afforded 3.3 g. of crystals of the methyl iodide quaternary salt of the title compound, m.p. 158°–9° C.

Analysis:
Found C 60.3; H, 6.2; I, 24.4%. $C_{26}H_{32}INO_2$ requires C, 60.45; H, 6.24; I, 24.5%.

EXAMPLE 6

Methyl 9-[4-(4-phenylpiperazino)-2-butynyl]-9-fluorenecarboxylate a. Following the method described in Example 1 (a) but using methyl 9-(2-propynyl)-9-fluorenecarboxylate (2.6 g.), 4-phenylpiperazine (1.7 1 g.), cuprous chloride (20 mg.) and paraformaldehyde (0.32 g.), in dioxane (50 ml.) 3.0 g. of colorless crystals of the hydrochloride, m.p. 183°–4° C., of the title compound were obtained.

Analysis:
Found C, 73.0; H, 6.2; N, 5.9; Cl, 7.5%. $C_{29}H_{29}ClN_2O_2$ requires C, 73.6; H, 6.2; N, 5.9; Cl, 7.5%.

When administered orally at a dosage of 25 mg./kg., this compound shows antiulcer activity.

EXAMPLE 7

Methyl 9-[4-(N-methyl-N-βhydroxyethyl)amino-2-butynyl]-9-fluorenecarboxylate Following the method of Example 1 (a) but using methyl 9-(2'-propynyl)-9-fluorenecarboxylate (5.2 g.), N-methylethanolamine (1.7 g.) and paraformaldehyde (0.7 g.) 4.93 g. of the hydrochloride of the title compound were obtained, m.p. 167.9° C.

Analysis:
Found C, 68.5; 1 H, 6.4; N, 4.3; Cl, 9.0%. $C_{22}H_{23}NO_3HCl$ requires C, 68.45; H, 6.3; N, 3.6; Cl, 9.2%.

EXAMPLE 8

Methyl 9-(1-methyl-4-morpholino-2-butynyl)-9-fluorenecarboxylate

Methyl 9-fluorenecarboxylate (8.4 g.) in methanol was added to a stirred solution of sodium (0.9 g.) in menthanol (50 ml.). 3-Chloro-1-butyne (8.0 g.) was added dropwise and the solution stirred for 2 hours at room temperature. The methyl alcohol was removed under reduced pressure and the residue suspended in water. Extraction with ether and drying over magnesium sulfate afforded 9.7 g. of methyl 9-(1-methyl-2-butynyl)-9-fluorenecarboxylate.

The crude ester obtained above was heated under reflux with morpholine (3.5 g.), paraformaldehyde (1.08 g.) and cuprous chloride (100 mg.) in dioxan (80 ml.) on a steam bath for 4 hours. The dioxan was removed under reduced pressure and the residue taken up in dilute hydrochloric acid. The acid was extracted with ether and the organic extracts were discarded. The aqueous layer was basified and extracted with benzene. After drying over magnesium sulfate the benzene was evaporated to leave an oil which afforded the hydrochloride of the title compound from 2-propanol and ethereal hydrogen chloride. Yield 1.7 g., m.p. 190°–2° C.

Analysis:
Found C 69.6; H, 6.5; Cl, 8.7%. $C_{24}H_{26}ClNO_3$ requires C, 69.95; H, 6.4; Cl, 8.6%.

EXAMPLE 9

9-(4-Morpholino-2-butynyl)-9-hydroxymethyl-fluorene

Methyl 9-(4-morpholino-2-butynyl)-9fluorenecarboxylate (18 g.) in dry tetrahydrofuran (100 ml.) was added to a stirred stirring for 3 hours, the mixture was cooled and decomposed by the cautious addition of water (20 ml.). The resulting pasty mass was filtered and the filtrate dried over magnesium sulfate Evaporation of the tetrahydrofuran yielded an oil which gave the crystalline hydrochloride of the title compound after dissolution in 2-propanol and ethereal hydrogen chloride. Yield 14.7 g., m.p. 239°–40° C.

Analysis:
Found C, 71.4; H, 6.7; Cl, 9.6%. $C_{22}H_{24}ClNO_2$ requires C, 71.45; H, 6.5; Cl, 9.6%.

EXAMPLE 10

9-(4-diisopropylamino-2-butynyl)-9-hydroxymethyl-fluorene

Methyl 9-(4-diisopropylamino-2-butynyl)-fluorenecarboxylate (18.0 g.) was reduced with lithium aluminum hydride (6.4 g.) in tetrahydrofuran (150 ml.) in the manner described in Example 9. The hydrochloride of the title compound (15.6 g.) was obtained, m.p. 242°–4° C.

Analysis:
Found C, 74.85; H, 8.1; Cl, 9.2%; $C_{24}H_{30}ClNO$ requires C, 75.1; H, 7.9; Cl, 9.3%.

EXAMPLE 11

9-(4-diethylamino-2-butynyl)-9-hydroxymethyl-fluorene

Methyl 9-(4-diethylamino-2-butynyl)-9-fluorenecarboxylate (18.1 g.) was reduced with lithium aluminum hydride in the manner described in Example 9. 17.4 g. of crystals of the hydrochloride of title compound were obtained, m.p. 149°–151° C.

Analysis:
Found C, 72.0; H, 7.3; Cl, 9.7%. $C_{22}H_{26}ClNO.1/2H_2O$ requires C, 72.4; H, 7.5; cl. 9.8%.

At an oral dosage of 100 mg./kg., this compound exhibits anti-metrazole activity.

EXAMPLE 12

Methyl 9-(4-morpholino-2-butynyl)-9-xanthenecarboxylate

Methyl 9-xanthenecarboxylate (12 g.) in dry dimethylformamide (50 ml.) was added dropwise to a stirred suspension of sodium hydride (50% in oil, 2.4 g.) in dry dimethylformamide. After stirring at room temperature for 30 minutes, propargyl bromide (6 g., 0.05 mole) in dry dimethylformamide (50 ml.) added dropwise with stirring and cooling. The reaction mixture was stirred at room temperature for a further hour. After pouring the reaction mixture into water, the aqueous mixture was extracted with benzene (4×100 ml.) and the benzene washed with water. After drying over magnesium sulfate evaporation yielded 11.6 g. of oil which gave 11.6 g. of methyl 9-(2-propynyl)-9-xanthenecarboxylate as colorless rhombs from methanol, m.p. 115°–117° C.

Analysis:
Found C, 77.4; H, 5.2%. $C_{18}H_{14}O_3$ requires C, 77.7; H, 5.1%.

Methyl 9-(2-propynyl)-9-xanthenecarboxylate (5.0 g.), paraformaldehyde (0.6 g.), morpholine (1.74 g.) and cuprous chloride were heated under reflux in dioxane (50 ml.) for 4 hours. After removal of the dioxan under reduced pressure the residue was taken up in dilute hydrochloric acid and extracted with benzene. The organic solution was discarded. Basification of the aqueous layer yielded an oil which was extracted with benzene. These extracts were dried over magnesium sulfate and evaporated to an oil which yielded 5.69 g. of pale yellow rhombs (m.p. 189°–190° C.) of the hydrochloride of the title compound after dissolution in 2-propanol and treatment with ethereal hydrogen chloride.

Analysis:
Found C, 67.5; H, 6.1; Cl, 8.3; $C_{23}H_{24}ClNO_4$ requires C, 67.0; H, 5,85; Cl, 8.5%.

The compound shows anti-inflammatory activity at an oral dose of 50 mg./kg.

EXAMPLE 13

Methyl 9-(4-diisopropylamino-2-butynyl)-9-xanthenecarboxylate a. Methyl 9-(2-propynyl)-9-xanthenecarboxylate (10 g.), paraformaldehyde (1.2 g.), diisopropylamine (4 g.) and cuprous chloride (100 mg. were reacted together in dioxan as described in Example 12. After working up in a similar fashion 14.2 g. of the hydrochloride of the title compound, m.p. 209°–10b$L$ C. were obtained.
Analysis:
Found C, 70.3; H, 7.0; N, 3.4%. $C_{25}H_{30}ClNO_3$ requires C, 69.7; H, 6.8; N, 3.4%.

This compound shows anticonvulsant activity when administered intraperitoneally at 50 mg./kg.

b. This hydrochloride was converted to the free base by treatment with aqueous sodium carbonate solution. 6 g. of the base were mixed with methyl iodide (10 g.) and heated under reflux in acetone for 5 hours. After evaporating off the excess methyl iodide and acetone under reduced pressure the residue crystallized from methanol ether to yield 6.1 g. of the methyl iodide quaternary salt of the title compound. m.p. 157°–8° C.
Analysis:
Found N, 2.8%. $C_{26}H_{32}INO_3$ requires N, 2.6%.

This compound shows anti-inflammatory action when administered orally at 50 mg./kg.

EXAMPLE 14

Methyl 9-(4-diethylamino-2-butynyl)-9-xanthenecarboxylate

Methyl 9-(2-propynyl)-9-xanthencarboxylate (10 g.), paraformaldehyde (1.2 g.), diethylamine (2.9 g.) and cuprous chloride (100 mg.) were reacted together in dioxan in the manner described in Example 12. 12.3 g. of colorless needles of the hydrochloride of the title compound were obtained, m.p. 198°–9° C.
Analysis:
Found C, 69.0; H, 6.9; N, 3.7%. $C_{23}H_{26}ClNO_3$ requires C, 69.1; H, 6.6; N, 3.5%.

EXAMPLE 15

Methyl 9-(4-benzylmethylamino-2-butynyl)-9-xanthenecarboxylate

Methyl 9-(2-propynyl)-9-xanthenecarboxylate (5.0 g.), benzylmethylamine (2.5 g.), paraformaldehyde (0.6 g.) and cuprous chloride (100 mg.) were reacted together in dioxan in the manner described in Example 12. The hydrochloride of the title compound (3.5 g.) was obtained as colorless rhombs, m.p. 178°–9° C.
Analysis:
Found C, 72.5; H, 6.0; Cl, 7.8%. $C_{27}H_{26}ClNO_3$ requires C, 72.4; H, 5.8; Cl, 7.9%.

EXAMPLE 16

9-(4-diethylamino-diethylamino-2-butynyl)-fluorene-9-N-methylcarboxamide

Methyl 9-(4-diethylamino-2-butynyl)-9-fluorenecarboxylate hydrochloride (1.9 g.) was stood in 33% alcoholic methylamine (20 ml.) at room temperature for 2 days. The alcoholic solution was evaporated to dryness, taken up in ether and washed with water. After drying over magnesium sulfate the ether was evaporated to yield an oil which, on treatment with 2-propanol and ethereal hydrogen chloride, gave 1.9 g. of the hydrochloride of the title compound, m.p. 208°–9° C.
Analysis:
Found C, 72.4; H, 7.25; Cl, 8.8%. $C_{23}H_{27}ClN_2O$ requires C, 72.12; H, 7.1; Cl, 9.2%.

This compound shows antiulcer activity when administered orally at 25 mg./kg.

EXAMPLE 17

9-(2-butynyl-4-diethylamino)fluorene-9-carboxamide

Methyl 9-(4-diethylamino-2-butynyl)-9-fluorenecarboxylate hydrochloride was stood in saturated solution of ammonia in methanol for 2 weeks. After working up as described in Example 16 1.48 g. of crystalline hydrochloride of the title compound were obtained, m.p. 239°–40° C.
Analysis:
Found C, 71.54; H, 6.95; Cl, 9.5%. $C_{22}H_{25}ClN_2O$ requires C, 71.6; H, 6.8 Cl, 9.8%.

This compound shows anti-inflammatory activity when given orally at 25 mg./kg., and also shows antitremorine activity when administered intraperitoneally at 30–50 mg./kg.

EXAMPLE 18

9-(4-diisopropylamino-2-butynyl)fluorene-9-N-methylcarboxamide

Methyl 9-(4-diisopropylamino-2-butynyl)-9-fluorenecarboxylate hydrochloride (3.15 g.) was stood in 33% aqueous methylamine (10 ml.) for 5 days at room temperature. After working up as described in Example 16, 1.5 g. of the hydrochloride of the title compound were obtained, m.p. 206°–208° C.
Analysis:
Found C, 70.7; H, 7.9; N, 6.3; Cl, 8.0% $C_{25}H_{31}ClN_2O.H_2O$ requires C, 69.6; H, 7.9; N, 6.5; Cl, 8.3%.

EXAMPLE 19

9-(4-diisopropylamino-2-butynyl)xanthene-9-N-methylcarboxamide

Methyl 9-(4-diisopropylamino-2-butynyl)-9-xanthenecarboxylate hydrochloride in 33% ethanolic methylamine (50 ml.) was heated in an autoclave at 100° C. for 24 hours. The ethanol was removed under reduced pressure and the residue dissolved in ether and washed with water. After drying over magnesium sulfate the ether was removed under reduced pressure to leave an oil which afforded 1.6 g. of the title compound, m.p. 108°–9° C. as needles (from petroleum ether, b.p. 80°–200b$L$ C.).
Analysis:
Found C, 77.3; H, 7.6%. $C_{25}H_{30}N_2O_2$ requires C, 76.9; H, 7.7%.

EXAMPLE 20

9-(4-diisopropylamino-b 2-butynyl)-9-xanthenecarboxylate hydrochloride (5 g.) was heated in methanolic ammonia (50 ml.) at 150° C. for 4 days. After working up as described in Example 19, 1.4 g. of he title compound, m.p. 97°–98° C. (from petroleum ether, b.p. 80°–100° C.).

Analysis:
Found C, 75.35; H, 7.6; N, 7.2%. $C_{24}H_{28}N_2O_2$ requires C, 76.6; H, 7.5; N, 7.5%.

EXAMPLE 21

N,N-dimethyl-9-(4-diethylamino-2-butynyl)-xanthene-9-carboxamide

Xanthene-9-carboxylic acid (67.8 g.) was added to a stirred suspension of sodium amide in liquid ammonia (900 ml.). Ether (1 litre) was added to the red solution of the disodium salt and the mixture stirred for 1.5 hours. Propargylbromide (51.4 g.) was added carefully and the red color slowly disappeared. After standing overnight and allowing the ammonia to evaporate, the suspended solid (the sodium salt of the acid) was dissolved in water and the ether washed with water. Acidification yielded an oil which was extracted into ether. Evaporation yielded 9-(2-propynyl)-xanthene-9-carboxylate as an oil which crystallized from benzene 52.7 g., m.p. 199°–202° C.

Analysis:

Found C, 77.0; H, 4.3%. $C_{17}H_{12}O_3$ requires C, 77.3; H, 4.6%.

9-(2-propynyl)-xanthene-9-carboxylate (9.05 g.) was heated under reflux with thionyl chloride (15 ml.) in benzene (78 ml.) for 1.5 hours. The benzene and thionyl chloride were removed under reduced pressure. Dry benzene (80 ml.) was added and evaporated under reduced pressure to remove the last traces of thionyl chloride. The remaining buff-colored solid was heated under reflux with ethanolic dimethylamine (25%, 60 ml.). On cooling 6.72 g. of fawn rhombs of N,N-dimethyl-9-(2-propynyl)-xanthene-9-carboxamide were obtained, m.p. 175°–178° C.

Analysis:

Found N, 5.15%. $C_{19}H_{17}NO_2$ requires N, 4.8%.

N,N-dimethyl 9-(2-propynyl)-xanthene-9-carboxamide (2.91 g.) was heated under reflux with diethylamine (0.88 g.), paraformaldehyde (0.36 g.) and cuprous chloride (50 mg. in dioxan (40 ml.) in the manner described in Example 1. After working up as described in that Example, 2.56 g. of the hydrochloride of the title compound, m.p. 183°–187° C. were obtained.

Analysis:

Found C, 69.2; H, 7.2; Cl, 8.4%. $C_{24}H_{29}ClN_2O_2 \cdot 1/2H_2O$ requires C, 70.6; H, 7.4, Cl, 8.7%.

This compound shows antiulcer activity when administered orally at 25 mg./kg. dosage.

What is claimed is:

1. A compound selected from the group consisting of fluorenes of the formula

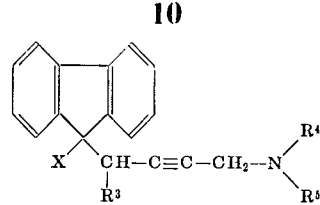

and the acid addition salts thereof with pharmaceutically acceptable acids and the quaternary ammonium methohalide salts thereof, wherein $R^3$ is a member of the group consisting of hydrogen and lower alkyl radicals, the radical

is a tertiary amino radical selected from the group consisting of di(lower alkyl)amino, lower alkyl phenyl(lower alkyl)amino, and lower alkyl lower alkanolamino, and X is lower alkoxycarbonyl.

2. A compound according to claim 1 which is methyl 9-(4-diethylamino-2-butynyl)-9-fluorenecarboxylate.

3. A compound according to claim 1 which is methyl 9-(4benzylmethylamino-2-butynyl)-9-fluorenecarboxylate.

4. A compound according to claim 1 which is methyl 9-(4-diisopropylamino-2-butynyl)-9fluorenecarboxylate.

5. A compound according to claim 1 which is methyl 9-[4-(N-methyl-N-β-hydroxyethyl)amino-2-butynyl]-9-fluorene carboxylate.